United States Patent
Kamada

(10) Patent No.: US 11,066,497 B2
(45) Date of Patent: Jul. 20, 2021

(54) LIQUID FORMULATION FOR REACTION INJECTION MOLDING AND MANUFACTURING METHOD THEREOF

(71) Applicant: RIMTEC CORPORATION, Tokyo (JP)

(72) Inventor: Michiru Kamada, Tokyo (JP)

(73) Assignee: RIMTEC CORPORATION, Tokyo (JP)

(*) Notice: Subject to any disclaimer, the term of this patent is extended or adjusted under 35 U.S.C. 154(b) by 0 days.

(21) Appl. No.: 16/728,549

(22) Filed: Dec. 27, 2019

(65) Prior Publication Data

US 2020/0140582 A1    May 7, 2020

Related U.S. Application Data

(63) Continuation of application No. 15/319,059, filed as application No. PCT/JP2015/067755 on Jun. 19, 2015, now abandoned.

(30) Foreign Application Priority Data

Jun. 27, 2014 (JP) ................. 2014-132008

(51) Int. Cl.
| | |
|---|---|
| C08F 32/08 | (2006.01) |
| B29B 7/02 | (2006.01) |
| C08G 61/08 | (2006.01) |
| B29C 67/24 | (2006.01) |
| B29B 7/00 | (2006.01) |
| B29C 45/00 | (2006.01) |
| C08J 5/00 | (2006.01) |
| B29K 45/00 | (2006.01) |

(52) U.S. Cl.
CPC .............. *C08F 32/08* (2013.01); *B29B 7/002* (2013.01); *B29C 45/0001* (2013.01); *B29C 67/246* (2013.01); *C08G 61/08* (2013.01); *C08J 5/00* (2013.01); *B29K 2045/00* (2013.01); *C08G 2261/3324* (2013.01); *C08J 2345/00* (2013.01)

(58) Field of Classification Search
CPC ..... C08F 32/08; B29B 7/002; B29C 45/0001; B29C 67/246; C08G 61/08; C08G 2261/3324; C08J 5/00; C08J 2345/00; B29K 2045/00
USPC .......................................................... 526/90
See application file for complete search history.

(56) References Cited

U.S. PATENT DOCUMENTS

| | | | | |
|---|---|---|---|---|
| 4,918,138 A | * | 4/1990 | Hara | ...... C08G 61/08 524/785 |
| 5,068,296 A | * | 11/1991 | Hara | ...... C08G 61/08 526/282 |
| 5,268,232 A | | 12/1993 | Khasat et al. | |

FOREIGN PATENT DOCUMENTS

| | | |
|---|---|---|
| JP | 4-279628 A | 10/1992 |
| JP | 2003-25364 A | 1/2003 |
| JP | 2003-26781 A | 1/2003 |
| JP | 2005-153265 A | 6/2005 |
| JP | 2008-163105 A | 7/2008 |
| JP | 2009-221402 A | 10/2009 |
| JP | 2010-254980 A | 11/2010 |
| JP | 2011-26588 A | 2/2011 |
| JP | 2011-122117 A | 6/2011 |
| RU | 2450028 C2 | 5/2012 |
| WO | 97/26291 A1 | 7/1997 |
| WO | 2014/103830 A1 | 7/2014 |

OTHER PUBLICATIONS

Office Action dated Mar. 31, 2020, issued in counterpart BR Application No. BR112016028156-0, with Informal English Translation. (6 pages).
Office Action dated Dec. 12, 2019, issued in counterpart EP Application No. 15 812 526.0. (5 pages).
Office Action dated Dec. 26, 2019, issued in counterpart IN Application No. 201747002198, with English translation. (8 pages).
International Search Report dated Sep. 8, 2015, issued in counterpart International Application No. PCT/JP2015/067755 (1 page).
Translation of Written Opinion dated Sep. 8, 2015, issued in counterpart International Application No. PCT/JP2015/067755 (6 pages).
Extended (supplementary) European Search Report dated Jan. 22, 2018, issued in counterpart European Application No. 15812526.0 (7 pages).
International Search Report dated Mar. 18, 2014, issued in corresponding application No. PCT/JP2013/083890 (2 pages).
Seihin Shosai Joho, "1.0mol/l Triisobutylaluminium Toluene Solution", Wako Pure Chemical Industries, Ltd., (http://www.siyaku.com/uh/Shs.do?dspCode=W01W0120-1384), cited in the ISR.
Extended (Supplementary) European Search Report dated Sep. 7, 2016, issued in counterpart European Patent Application No. 13866947.8. (4 pages).
Non-Final Office Action dated Dec. 29, 2017, dated U.S. Appl. No. 15/319,059. (19 pages).
Non-Final Office Action dated Jun. 2, 2017, dated U.S. Appl. No. 14/655,981. (18 pages).
Office Action dated Oct. 4, 2018, issued in counterpart Russian application No. 2017102308/04(004069), with English translation. (13 pages).

(Continued)

*Primary Examiner* — William K Cheung
(74) *Attorney, Agent, or Firm* — Westerman, Hattori, Daniels & Adrian, LLP

(57) ABSTRACT

A method for manufacturing a liquid formulation for reaction injection molding for polymerizing a norbornene-based monomer in the presence of a metathesis polymerization catalyst comprising tungsten as a center metal, the liquid formulation comprising a norbornene-based monomer, provided that in case where the norbornene-based monomer includes exo-dicyclopentadiene, a content of exo-dicyclopentadiene is from 0 to 2% by mass of the norbornene-based monomer, an activator of the catalyst, and a specific ether compound.

5 Claims, No Drawings

(56) References Cited

OTHER PUBLICATIONS

Final Office Action dated May 1, 2019, dated U.S. Appl. No. 15/319,059.
Non-Final Office Action dated Oct. 4, 2019, dated U.S. Appl. No. 15/319,059.
Office Action dated Apr. 16, 2021, issued in counterpart CA Application No. 2,951,820. (3 pages).

* cited by examiner

LIQUID FORMULATION FOR REACTION INJECTION MOLDING AND MANUFACTURING METHOD THEREOF

This application is a Continuation of application Ser. No. 15/319,059, filed on Dec. 15, 2016 (now abandoned), which was filed as a PCT International Application No. PCT/JP2015/067755 on Jun. 19, 2015, which claims the benefit under 35 U.S.C. § 119(a) to Patent Application No. 2010-285726, filed in Japan on Jun. 27, 2014, all of which are hereby expressly incorporated by reference into the present application.

TECHNICAL FIELD

The present invention relates to a liquid formulation for reaction injection molding containing a norbornene-based monomer, a manufacturing method thereof, a method for manufacturing a reaction injection-molded article using the liquid formation for reaction injection molding, and a reaction injection-molded article obtained thereby.

BACKGROUND ART

Conventionally, a method called a reaction injection molding method (RIM method), including injecting a liquid reaction mixture containing a norbornene-based monomer and a metathesis polymerization catalyst in a mold, and carrying out a bulk ring-opening polymerization of the liquid reaction mixture to manufacture a resin molded article (reaction injection-molded article) made of a norbornene-based resin has been known.

For example, Patent Publication 1 discloses a technique including carrying out a bulk ring-opening polymerization of a norbornene-based monomer-containing liquid formulation for reaction injection molding containing a specified elastomer according to RIM method, thereby giving a resin molded article with reduced sink marks on the surface of the molded article irrespective of shapes, sizes and the like of the mold.

In addition, Patent Publication 2 discloses a method for manufacturing a resin molded article including carrying out a bulk ring-opening polymerization of a novel metathesis polymerizable monomer containing a specified amount of an exo-dicyclopentadiene according to RIM method, thereby giving a sufficiently cured cross-linked polymer molded article having a low residual ratio of monomer. Also, Patent Publication 2 describes that if an ether compound is added to a reactive solution used in the manufacture of a resin molded article, storage stability can be improved.

PRIOR ART REFERENCES

Patent Publications

Patent Publication 1: Japanese Patent Laid-Open No. 2008-163105 Patent Publication 2: Japanese Patent Laid-Open No. 2003-25364

SUMMARY OF THE INVENTION

Problems to be Solved by the Invention

As a result of studies on the inventions disclosed in the above Patent Publications 1 and 2 with the aim of the development of quality improvement techniques of the resin molded articles obtained according to RIM method, the present inventor has clarified that if a liquid formulation is stored for a needed period of time from the practical viewpoint, the time required for gelation of the reactive liquid mixture obtained by mixing a liquid formulation (which may be hereinafter referred to as "gelation time") becomes too short, thereby causing filling failure into a mold, and residual resins during mold release on mold surface, so that the quality of the resin molded article obtained may be markedly lowered in some cases.

Therefore, an object of the present invention is to provide a liquid formulation for reaction injection molding having excellent storage stability, a manufacturing method thereof, a method for manufacturing a reaction injection-molded article having high quality and also excellent strength using the liquid formulation for reaction injection molding, and a reaction injection-molded article obtained thereby.

Means to Solve the Problems

The present inventor has remarked on the formulation components during the preparation of the liquid formulation for reaction injection molding, and further in the mixing order thereof, and studied. As a result, he has found that the above problems can be solved by obtaining a desired liquid formulation for reaction injection molding by using a given ether compound, and mixing a norbornene-based monomer with an activator of a catalyst in the presence of the above compound, and the present invention has been perfected thereby.

Specifically, the gist of the present invention relates to:
[1] a liquid formulation for reaction injection molding for polymerizing a norbornene-based monomer in the presence of a metathesis polymerization catalyst including tungsten as a center metal, the liquid formulation containing a norbornene-based monomer, an activator of the catalyst, and an ether compound represented by formula (1):

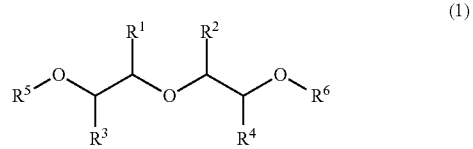

wherein, each of $R^1$, $R^2$, $R^3$ and $R^4$ independently stands for a hydrogen atom or an alkyl group having from 1 to 6 carbon atoms; each of $R^5$ and $R^6$ independently stands for an alkyl group having from 1 to 6 carbon atoms, with proviso that when $R^5$ and $R^6$ are a methyl group, at least one of $R^1$ to $R^4$ is an alkyl group having from 1 to 6 carbon atoms, the liquid formulation obtained by mixing the norbornene-based monomer and the activator in the presence of at least the ether compound;

[2] a method for manufacturing a liquid formulation for reaction injection molding as defined in the above [1], including the step of: mixing the norbornene-based monomer and the activator in the presence of at least the ether compound;

[3] a method for manufacturing a reaction injection-molded article, including the step of subjecting a reactive liquid mixture obtained by mixing a liquid formulation for reaction injection molding as defined in the above [1], with a metathesis polymerization catalyst including tungsten as a center metal to bulk polymerization in a mold, thereby carrying out reaction injection molding; and

[4] a reaction injection-molded article obtained by the method as defined in the above [3].

Effects of the Invention

According to the present invention, a liquid formulation for reaction injection molding having excellent storage stability, and a reaction injection-molded article having high quality and also excellent strength can be provided.

MODES FOR CARRYING OUT THE INVENTION

The modes for carrying out the present invention will be explained in detail hereinbelow under the sections of 1) a liquid formulation for reaction injection molding, 2) a method for manufacturing a reaction injection-molded article, and 3) a reaction injection-molded article.

1) Liquid Formulation for Reaction Injection Molding

The liquid formulation for reaction injection molding of the present invention contains (a) a norbornene-based monomer, (b) an activator, and (c) an ether compound represented by formula (1) given later.

A reaction injection-molded article can be obtained by subjecting a reactive liquid mixture obtained by mixing a liquid formulation for reaction injection molding, with a metathesis polymerization catalyst including tungsten as a center metal to a bulk polymerization in a mold.

(a) Norbornene-Based Monomer

The norbornene-based monomer is a compound having a norbornene structure represented by formula (2):

(2)

which may be hereinafter referred to as a "norbornene-based monomer (a)" in some cases.

The norbornene-based monomer (a) includes norbornene-based monomers that do not have a ring that condenses with a norbornene ring in the molecule; tricyclic or higher polycyclic norbornene-based monomers; and the like. The norbornene-based monomer (a) can be used alone or in a mixture of two or more kinds.

Specific examples of the norbornene-based monomers that do not have a ring that condenses with a norbornene ring in the molecule include norbornenes that are unsubstituted or have an alkyl group, such as norbornene, 5-methylnorbornene, 5-ethylnorbornene, 5-butylnorbornene, 5-hexylnorbornene, 5-decylnorbornene, 5-cyclohexylnorbornene, and 5-cyclopentylnorbornene; norbornenes having an alkenyl group, such as 5-ethylidenenorbornene, 5-vinylnorbornene, 5-propenylnorbornene, 5-cyclohexenylnorbornene, and 5-cyclopentenylnorbornene; norbornenes having an aromatic ring, such as 5-phenylnorbornene; norbornenes having a polar group including an oxygen atom, such as 5-methoxycarbonylnorbornene, 5-ethoxycarbonylnorbornene, 5-methyl-5-methoxycarbonylnorbornene, 5-methyl-5-ethoxycarbonylnorbornene, norbonenyl-2-methylpropionate, norbornenyl-2-methyloctanate, 5-hydroxymethylnorbornene, 5,6-di(hydroxymethyl)norbornene, 5,5-di(hydroxymethyl)norbornene, 5-hydroxy-i-propylnorbornene, 5,6-dicarboxynorbornene, and 5-methoxycarbonyl-6-carboxynorbornene; norbornenes having a polar group including a nitrogen atom, such as 5-cyanonorbornene, and the like.

The tricyclic or higher polycyclic norbornene-based monomer refers to a norbornene-based monomer including a norbornene ring and one or more rings condensed with the norbornene ring in the molecule. Specific examples thereof include a monomer represented by formula (3) given below:

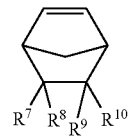
(3)

wherein each of $R^7$, $R^8$, $R^9$, and $R^{10}$ is independently a hydrogen atom; a halogen atom; a hydrocarbon group having from 1 to 20 carbon atoms which may have a substituent; or a substituent including a silicon atom, an oxygen atom, or a nitrogen atom, wherein $R^8$ and $R^9$ are together bonded to each other to form a ring; or
a monomer represented by formula (4) given below:

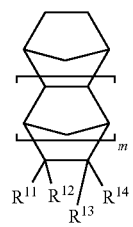
(4)

wherein each of $R^{11}$, $R^{12}$, $R^{13}$, and $R^{14}$ is independently a hydrogen atom; a halogen atom; a hydrocarbon group having from 1 to 20 carbon atoms which may have a substituent; a substituent including a silicon atom, an oxygen atom, or a nitrogen atom, wherein $R^{11}$ and $R^{12}$ or $R^{13}$ and $R^{14}$ may be bonded to each other to form a ring; and m is 1 or 2.

The monomer represented by formula (3) includes, for example, dicyclopentadiene, methyldicyclopentadiene, tricyclo[5.2.1.0$^{2,6}$]deca-8-ene, tetracyclo[9.2.1.0$^{2,10}$.0$^{3,8}$]tetradeca-3,5,7,12-tetraene (also referred to as 1,4-methano-1,4,4a,9a-tetrahydro-9H-fluorene), tetracyclo[10.2.1.0$^{2,11}$.0$^{4,9}$]pentadeca-4,6,8,13-tetraene (also referred to as 1,4-methano-1,4,4a,9,9a, 10-hexahydroanthracene), and the like.

There are two kinds of steric isomers for the dicyclopentadienes: endo-dicyclopentadiene [formula (5)] and exo-dicyclopentadiene [formula (6)]. Simply calling a dicyclopentadiene would refer to endo-dicyclopentadiene. The main component of the dicyclopentadiene, which is presently industrially available, is endo-dicyclopentadiene, and the content of the exo-dicyclopentadiene is from 0 to 2% by mass or so.

(5)

(6)

The monomer represented by formula (4) includes tricyclopentadiene, and tetracyclododecenes, wherein m is 1; and hexacycloheptadecenes, wherein m is 2.

Specific examples of the tetracyclododecenes include tetracyclododecenes which are unsubstituted or have an alkyl group, such as tetracyclododecene, 8-methyltetracyclododecene, 8-ethyltetracyclododecene, 8-cyclohexyltetracyclododecene, and 8-cyclopentyltetracyclododecene; tetracyclododecenes which have a double bond outside the ring, such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene; tetracyclododecenes which have an aromatic ring, such as 8-phenyltetracyclododecene; tetracyclododecenes which have a substituent including an oxygen atom, such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic acid anhydride; tetracyclododecenes which have a substituent including a nitrogen atom, such as 8-cyanotetracyclododecene and tetracyclododecene-8,9-dicarboxylic acid imide; tetracyclododecenes which have a substituent including a halogen atom, such as 8-chlorotetracyclododecene; tetracyclododecenes which have a substituent including a silicon atom, such as 8-trimethoxysilyltetracyclododecene; and the like.

Specific examples of the hexacycloheptadecenes include hexacycloheptadecenes which are unsubstituted or have an alkyl group, such as hexacycloheptadecene, 12-methylhexacycloheptadecene, 12-ethylhexacycloheptadecene, 12-cyclohexylhexacycloheptadecene, and 12-cyclopentylhexacycloheptadecene; hexacycloheptadecenes which have a double bond outside the ring, such as 12-methylidenehexacycloheptadecene, 12-ethylidenehexacycloheptadecene, 12-vinylhexacycloheptadecene, 12-propenylhexacycloheptadecene, 12-cyclohexenylhexacycloheptadecene, and 12-cyclopentenylhexacycloheptadecene; hexacycloheptadecenes which have an aromatic ring, such as 12-phenylhexacycloheptadecene; hexacycloheptadecenes which have a substituent including an oxygen atom, such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene-12,13-dicarboxylic acid, and hexacycloheptadecene-12,13-dicarboxylic acid anhydride; hexacycloheptadecenes which have a substituent including a nitrogen atom, such as 12-cyanohexacycloheptadecene and hexacycloheptadecene-12,13-dicarboxylic acid imide; hexacycloheptadecenes which have a substituent including a halogen atom, such as 12-chlorohexacycloheptadecene; hexacycloheptadecenes which have a substituent including a silicon atom, such as 12-trimethoxysilylhexacycloheptadecene; and the like.

These norbornene-based monomers can be used alone or in a combination of two or more kinds.

Among these norbornene-based monomers, the tricyclic or higher polycyclic norbornene-based monomers are preferred, and tricyclic, tetracyclic, or pentacyclic norbornene-based monomers are more preferred, from the viewpoint of being readily available, having excellent reactivity and obtaining a resin molded article having excellent heat resistance.

In addition, it is preferable that a cross-linkable norbornene-based monomer having two or more reactive double bonds (a norbornene-based monomer that gives a ring-opening polymer having a cross-reactive double bond), such as a symmetric cyclopentadiene trimer, is used together with another norbornene-based monomer (a norbornene-based monomer that gives a ring-opening polymer without a cross-reactive double bond), from the viewpoint of obtaining a heat-curable ring-opening polymer. It is preferable that a proportion of the cross-linkable norbornene-based monomer used is from 2 to 30% by mass of the entire norbornene-based monomers (a).

Further, a monomer which is ring-opening copolymerizable with the norbornene-based monomer may be used within the range that would not impair the object of the present invention. The monomer as mentioned above includes monocyclic cycloolefins, such as cyclobutene, cyclopentene, cyclopentadiene, cyclooctene, cyclododecene, and the like. A proportion of the monomer mentioned above used is preferably 10 parts by mass or less, and more preferably 5 parts by mass or less, based on 100 parts by mass of the norbornene-based monomer (a).

(b) Activator

The activator in the present invention (which may be hereinafter referred to as "activator (b)") is also called a co-catalyst, which is added for the purpose of enhancing polymerization activity of the metathesis polymerization catalyst.

The activator (b) is not particularly limited, so long as the polymerization activity of the metathesis polymerization catalyst including tungsten as a center metal which is mixed with the liquid formulation of the present invention is enhanced. The activator (b) includes, for example, organometal compounds of metals of Groups 11 to 14 of the Periodic Table. Specific examples include alkylaluminum compounds such as triethylaluminum, triisobutylaluminum, trimethylaluminum, tributylaluminum, trihexylaluminum, and trioctylaluminum; alkylaluminum halide compounds such as ethylaluminum dichloride, diethylaluminum chloride, diisobutylaluminum chloride, ethylaluminumsesquichloride, isobutylaluminum dichloride, and dioctylaluminum iodide; alkylaluminum alkoxide compounds such as diethylammonium ethoxide; organotin compounds such as tetrabutyltin; organozinc compounds such as diethylzinc; and the like.

Among them, the alkylaluminum compounds and the alkylaluminum halide compounds are preferred, and more specifically triethylaluminum, trioctylaluminum, diethylaluminum chloride, and dioctylaluminum iodide are more preferred. The activator (b) can be used alone or in a mixture of two or more kinds.

Although the amount of the activator (b) used is not particularly limited, it is preferable that the activator is blended in a given proportion based on the above norbornene-based monomer (a), from the viewpoint of enhancing polymerization activity of the metathesis polymerization catalyst, and improving reaction efficiency. In other words, the norbornene-based monomer and the activator are in a molar ratio (norbornene-based monomer (a)/activator (b)) of preferably from 100/1 to 2,000/1, more preferably from 150/1 to 1,500/1, and even more preferably from 200/1 to 1,200/1.

(c) Ether Compound Represented by Formula (1)

The liquid formulation for reaction injection molding of the present invention further contains an ether compound represented by the following formula (1) (which may be hereinafter referred to as "ether compound (c)"). The ether compound (c) is used as an activity modulator for the metathesis polymerization catalyst.

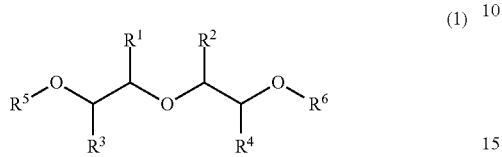
(1)

wherein, in the above formula (1), each of $R^1$, $R^2$, $R^3$ and $R^4$ independently stands for a hydrogen atom or an alkyl group having from 1 to 6 carbon atoms; each of $R^5$ and $R^6$ independently stands for an alkyl group having from 1 to 6 carbon atoms, with proviso that when $R^5$ and $R^6$ are a methyl group, at least one of $R^1$ to $R^4$ is an alkyl group having from 1 to 6 carbon atoms. The alkyl group having from 1 to 6 carbon atoms includes a methyl group, an ethyl group, an isopropyl group, an n-propyl group, an isobutyl group, a sec-butyl group, a t-butyl group, an n-butyl group, an n-pentyl group, and an n-hexyl group, and the like.

Specific examples of the ether compound (c) include a group of compounds represented by the following formulas.

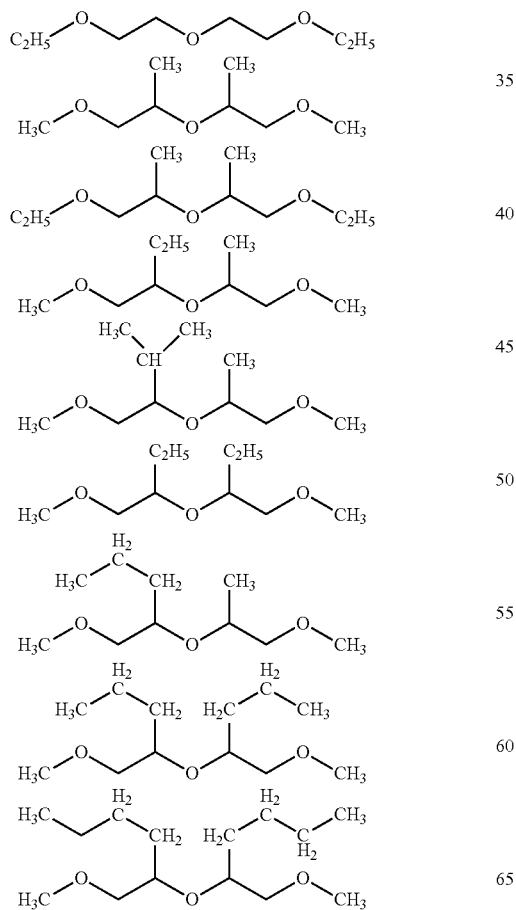

-continued

-continued

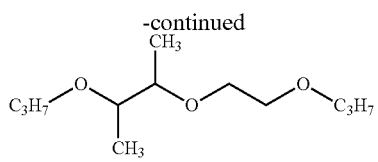

Among them, from the viewpoint of inhibition of residual resins on a mold surface upon mold release, and improvement in strength of the reaction injection-molded article, the ether compound (c) is preferably a compound represented by the following formula (1-1):

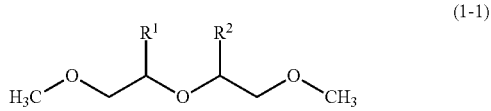

wherein $R^1$ and $R^2$ are as defined above, with proviso that $R^1$ and/or $R^2$ is an alkyl group having from 1 to 6 carbon atoms, the compound represented by formula (1-1), wherein both of $R^1$ and $R^2$ are alkyl groups having from 1 to 3 carbon atoms in formula (1-1) is more preferred, and the compound represented by formula (1-1), wherein both of $R^1$ and $R^2$ are methyl groups in formula (1-1) (dipropylene glycol dimethyl ether) is especially preferred.

Here, an asymmetric carbon atom can be present in the ether compound represented by formula (1), and its steric configuration is not particularly limited.

The ether compound (c) can be all produced in accordance with a known method. In addition, as the ether compound (c), a commercially available product can be directly used, or can be purified as needed. The ether compound (c) can be used alone or in a mixture of two or more kinds.

It is preferable that the ether compound (c) is blended in a given proportion based on the above activator (b) in the liquid formulation for reaction injection molding of the present invention, from the viewpoint of inhibition of residual resins on a surface of the mold upon mold release, and improvement in strength of the reaction injection-molded article. Specifically, the ether compound and the activator are in a molar ratio (ether compound (c)/activator (b)) of preferably from 0.1/1 to 30/1, more preferably from 1/1 to 10/1, and even more preferably from 3/1 to 5/1.

The gelation time when the liquid formulation for reaction injection molding of the present invention is mixed with a metathesis polymerization catalyst including tungsten as a center metal depends upon the kinds and amount of the norbornene-based monomer etc. used, and mold temperature, and the like, it is preferable that the gelation time is 2 seconds or longer in order to obtain a molded article free from failures in external appearances of the surface. The above ratio is advantageous in securing the gelation time.

(d) Other Components

The liquid formulation for reaction injection molding of the present invention may be blended with other components (which may be hereinafter referred to as "other components (d)") as desired, in order to more efficiently manufacture a resin molded article, or in order to improve or maintain the properties of the resin molded article.

Other components (d) include polymerization promoters, elastomers, fillers, reinforcing materials, antioxidants, thermal stabilizers, photo-stabilizers, ultraviolet absorbents, pigments, colorants, blowing agents, antistatic agents, flame retardants, lubricants, softening agents, tackifying agents, plasticizers, mold-releasing agents, deodorants, perfume, dicyclopentadiene-based heat-polymerization resin and hydrogenated compounds thereof, and the like.

The polymerization promoter is added in order to improve a polymerization conversion rate of the monomers. As the polymerization promoter, a chlorine atom-containing compound is preferred, and an organic chlorine compounds and silicon chloride compounds are more preferred. Specific examples include 2-chlorobenzotrichloride, 2,4-dichlorobenzotrichloride, hexachloro-p-xylene, 2,4-dichlorotrichlorotoluene, and silicon tetrachloride, and the like.

When a polymerization promoter is used, it is preferable that the amount thereof would be usually from 10 mass ppm to 10% by mass of the overall reactive liquid mixture.

The elastomer includes natural rubbers, polybutadiene, polyisoprene, styrene-butadiene copolymers (SBR), styrene-butadiene-styrene block copolymers (SBS), styrene-isoprene-styrene copolymers (SIS), ethylene-propylene copolymers, ethylene-propylene-diene terpolymers (EPDM), ethylene-vinyl acetate copolymers (EVA) and hydrogenated products thereof, and the like.

The elastomer is added in order to give fluidity to the liquid formulation, thereby giving a molded article with reduced sink marks. As the elastomer, an elastomer having a shear rate coefficient of from 1.30 to 1.60 is preferred. Here, the shear rate coefficient is a numerical value obtained by a method described in Patent Publication 1 mentioned above.

When an elastomer is used, its blending amount is preferably from 0.5 to 20 parts by mass, and more preferably from 2 to 10 parts by mass, based on 100 parts by mass of the norbornene-based monomers.

The filler is not particularly limited, and a fibrous filler having an aspect ratio of usually from 5 to 100, and preferably from 10 to 50, and an inorganic filler made of a particulate filler having an aspect ratio of usually from 1 to 2, and preferably from 1 to 1.5 are preferred. Here, the aspect ratio of the filler refers to a ratio of the average length diameter to a 50% volume cumulative diameter of the filler. The average length diameter as used herein is a number-average length diameter obtained by measuring length diameters of 100 fillers randomly selected with an optical photomicrograph, and calculating an arithmetic means thereof. In addition, the 50% volume cumulative diameter is a value obtained by measuring the particle size distribution according to X-ray permeation method.

When a filler is used, the amount of the filler used is preferably from 5 to 55 parts by mass, and more preferably from 10 to 45 parts by mass, based on 100 parts by mass of a total amount of the norbornene-based monomer and the metathesis polymerization catalyst. When the amount of the filler is exceedingly large, there are some risks that the reactive liquid mixture precipitates in the tank or the pipe when injected into a mold, or the injection nozzles are clogged. On the other hand, when the amount of the filler is too small, there are some cases where rigidity or dimensional stability of the molded articles obtained is insufficient.

The method for adding the other component (d) can be appropriately selected depending upon the kinds of the additives and the like.

The liquid formulation for reaction injection molding of the present invention contains a norbornene-based monomer (a), an activator (b), and an ether compound (c) as mentioned above as essential components. The liquid formulation for reaction injection molding of the present invention may contain other component (d) as desired. In addition, it is needed that the liquid formulation for reaction injection molding of the present invention is obtained by mixing a norbornene-based monomer (a) and an activator (b) in the presence of at least an ether compound (c). In a case where a liquid formulation is prepared through the steps of mixing only two components of a norbornene-based monomer (a) and an activator (b), even if the norbornene-based monomer (a) used is at least a part of all the norbornene-based monomer (a) used, when the liquid formulation is stored for a needed time and used from the practical viewpoint, the gelation time of a reactive liquid mixture obtained from the liquid formulation becomes too short, so that filling failure to a mold, or residual resin on a mold surface upon mold release is caused, thereby lowering the quality of the molded article obtained. It is difficult to specify a product formed when mixing a norbornene-based monomer (a) and an activator (b) in the presence of at least an ether compound (c) directly by its structure or properties. However, some sorts of composite state is formed by performing mixing as mentioned above, and the liquid formulation obtained is stably kept without undergoing changes in the properties even when stored for a needed time, so that the reactive liquid mixture obtained is assumed to show a proper gelation time.

Examples of specific embodiments of mixing a norbornene-based monomer (a) and an activator (b) in the presence of at least an ether compound (c) include the following:

Embodiment A

An embodiment of mixing a liquid mixture containing an ether compound (c) and an activator (b), and a norbornene-based monomer (a). Here, in this embodiment, a norbornene-based monomer (a) may be mixed as a liquid mixture containing a part of an ether compound (c) used. ((a), (b), (c), and the liquid mixture may each optionally contain other component (d) within the range that would not impair the effects of the present invention.)

Embodiment B

An embodiment of mixing a liquid mixture containing an ether compound (c) and a norbornene-based monomer (a), and an activator (b). Here, in this embodiment, an activator (b) may be mixed as a liquid mixture containing a part of an ether compound (c) used. ((a), (b), (c), and the liquid mixture may each optionally contain other component (d) within the range that would not impair the effects of the present invention.)

Embodiment C

A step of mixing concurrently a norbornene-based monomer (a), the activator (b), and the ether compound (c). ((a), (b), and (c) may each optionally contain other component (d) within the range that would not impair the effects of the present invention.)

Among the above Embodiment Examples, Embodiment A is preferred, from the viewpoint of improving storage stability of the liquid formulation for reaction injection molding of the present invention.

2) Method for Manufacturing Reaction Injection-Molded Article

The reaction injection-molded article of the present invention is obtained by a method including the step of subjecting a reactive liquid mixture prepared by mixing a liquid formulation for reaction injection molding of the present invention mentioned above and a metathesis polymerization catalyst including tungsten as a center metal to bulk polymerization in a mold, thereby carrying out reaction injection molding.

By using the liquid formulation for reaction injection molding of the present invention, even after storage for a needed time, a reactive liquid mixture obtained is capable of showing a proper gelation time. Although the gelation time depends upon the kinds and amounts of the norbornene-based monomer or the like used, mold temperatures, and the like, the gelation time is preferably 2 seconds or more, more preferably from 5 seconds to 6 minutes, and even more preferably from 10 seconds to 5 minutes.

The metathesis polymerization catalyst is not particularly limited, so long as the catalyst includes tungsten as a center metal, and is capable of allowing ring-opening polymerization of a norbornene-based monomer. The metathesis polymerization catalyst can be used alone or in a mixture of two or more kinds.

The metathesis polymerization catalyst is a complex including a tungsten atom as a center atom, and plural ions, atoms, polyatomic ions and/or compounds are bonded thereto. The metathesis polymerization catalyst includes, for example, tungsten halides such as $WCl_6$, $WCl_5$, $WCl_4$, $WCl_2$, $WBr_6$, $WBr_4$, $WBr_2$, $WF_6$, $WF_4$, $WI_6$, and $WI_4$; tungsten oxyhalides such as $WOCl_4$, $WOBr_4$, $WOF_4$, $WCl_2(OC_6H_5)_4$, and $W(OC_2H_5)_2Cl_3$; metal oxides such as tungsten oxide; organotungsten compounds such as $(CO)_5WC(OCH_3)(CH_3)$, $(CO)_5WC(OC_2H_5)(CH_3)$, $(CO)_5WC(OC_2H_5)$, $W(OC_6H_5)_6$, and $W(CO)_3.(CH_3CN)_3$; tungsten alkylidene compounds such as $W(N-2,6-C_6H_3Pr^i{}_2)(CHBu^t)(OCMe_2CF_3)_2$, $W(N-2,6-C_6H_3Pr^i{}_2)(CHBu^t)(OCMe_2CF_3)_2)_2)$, $W(N-2,6-C_6H_3Pr^i{}_2)(CHCMe_2Ph)(OBu^t)_2$, $W(N-2,6-C_6H_3Pr^i{}_2)(CHCMe_2Ph)(OCMe_2CF_3)_2$, and $W(N-2,6-C_6H_3Pr^i{}_2)(CHCMe_2Ph)(OCMe_2CF_3)_2)_2)$, wherein $Pr^i$ is an i-propyl group, $Bu^t$ is a t-butyl group, Me is a methyl group, and Ph is a phenyl group; and the like.

Among them, the tungsten halides and the tungsten oxyhalides are preferred, and more specifically $WCl_6$ and $WOCl_4$ are more preferred.

The amount of the metathesis polymerization catalyst used is preferably 0.01 mmol or more, and more preferably 0.1 mmol or more, and preferably 50 mmol or less, and more preferably 20 mmol or less, based on one mol of the norbornene-based monomer to be used in the reaction (or a total mol when two or more kinds of the norbornene-based monomers are used), when taking the balance between maintenance of appropriate reaction efficiency and economic advantages into consideration.

It is preferable that the metathesis polymerization catalyst is used in a given ratio to the activator (b) contained in the liquid formulation for reaction injection molding of the present invention, from the viewpoint of favorably keeping polymerization reaction and production efficiency. Specifically, it is desired that the metathesis polymerization catalyst is used so that the activator (b) would be in an amount of preferably 0.1 mol or more and 100 mol or less, and more preferably 1 mol or more and 10 mol or less, based on one mol of the metathesis polymerization catalyst.

Here, it is preferable that a metathesis polymerization catalyst is used after previously suspending in an inert solvent such as benzene, toluene and chlorobenzene, and adding a small amount of an alcoholic compound and/or a phenolic compound to solubilize. The alcoholic compound to be used herein includes ethanol, 1-propanol, 2-propanol, 1-butanol, 2-butanol, t-butanol, and the like. In addition, the phenolic compound to be used includes t-butylphenol, t-octylphenol, nonylphenol, dodecylphenol, and the like.

Here, a Lewis base or a chelating agent may be added and used in an amount of from about 1 to about 5 mol, based on one mol of the metathesis polymerization catalyst. The Lewis base and the chelating agent include acetyl acetone, alkyl acetoacetates, tetrahydrofuran, and benzonitrile, and the like.

According to the RIM method, in general, a resin molded article is manufactured by mixing at least two liquid formulations of a liquid formulation A that contains an activator but does not contain a metathesis polymerization catalyst, and a liquid formulation B containing a metathesis polymerization catalyst, and subjecting a reactive liquid mixture obtained to bulk polymerization and molding concurrently. Usually, the method for manufacturing a reaction injection-molded article of the present invention is preferably carried out according to an RIM method. The liquid formulation for reaction injection molding of the present invention is suitably used as a liquid formulation A. When a liquid formulation for reaction injection molding of the present invention is assumed to be a liquid formulation A, a liquid formulation B which is used together therewith is not particularly limited, so long as the liquid formulation contains a metathesis polymerization catalyst including tungsten as a center metal, and it is preferable that the liquid formulation contains a norbornene-based monomer (a) mentioned above and a metathesis polymerization catalyst mentioned above, from the viewpoint of improving homogeneity of a reactive liquid mixture obtained. In addition, a liquid formulation B may contain each of an ether compound (c) and other components (d). When a liquid formulation B contains a norbornene-based monomer (a) or the like, a norbornene-based monomer (a) and the like of a liquid formulation A and a norbornene-based monomer (a) and the like of a liquid formulation B may be identical or different from each other. According to the present invention, for example, a two-liquid-type liquid formulation for reaction injection molding composed of a liquid formulation A composed of a liquid formulation for reaction injection molding of the present invention and a liquid formulation B containing a norbornene-based monomer (a) and a metathesis polymerization catalyst including tungsten as a center metal can also be provided.

When the method for manufacturing a reaction injection-molded article of the present invention is carried out according to an RIM method, it is preferable to use a known reaction injection molding (RIM) apparatus. For example, a reaction injection-molded article can be manufactured by individually preparing a liquid formulation A composed of a liquid formulation for reaction injection molding of the present invention, and a liquid formulation B containing a norbornene-based monomer (a) and a metathesis polymerization catalyst including tungsten as a center atom mentioned above, mixing the liquid formulation A and the liquid formulation B within the above apparatus, injecting a reactive liquid mixture obtained into a mold, and subjecting the reactive liquid mixture to bulk polymerization. Here, in addition to the liquid formulation A and the liquid formulation B mentioned above, a liquid formulation C composed of a norbornene-based monomer (a) or the like may be further used as desired. The liquid formulation A, the liquid formulation B, and the liquid formulation C or the like which are used in the method for manufacturing a reaction injection-molded article of the present invention may be collectively referred to as a reaction stock solution.

The mixing of a liquid formulation A, a liquid formulation B or the like mentioned above can be carried out by supplying each of them individually to an apparatus for reaction injection molding, and instantaneously mixing in a collision mixing apparatus (mixing head). Here, a dynamic mixer or a low-pressure injection machine such as a static mixer can be used in place of the collision mixing apparatus.

The temperature of the reaction stock solution before supplying to an apparatus for reaction injection molding is preferably from 10° to 60° C., and the viscosity of the reaction stock solution is, for example, preferably from 5 to 3,000 mPa·s or so, and more preferably from 50 to 1,000 mPa·s or so, at 30° C.

The mold used in the reaction injection molding is not particularly limited, and usually a mold formed by a core mold and a cavity mold is used.

The material of the mold is not particularly limited, and includes metals such as steel, aluminum, zinc alloys, nickel, copper, and chromium, and resins and the like. In addition, these molds may be manufactured by any of methods such as casting, forging, metallizing, and electroforming, or those that are plated may be also used.

The structure of the mold may be determined by considering the pressure upon injecting a reactive liquid mixture into a mold. In addition, the mold clamping pressure of the mold is preferably a gauge pressure of from 0.1 to 9.8 MPa or so.

For example, in a case where bulk polymerization is carried out by using a pair of molds of a core mold and a cavity mold, and supplying a reactive liquid mixture in the cavities formed by these molds, in general, it is preferable that a mold temperature T1 (° C.) of the mold at a design surface is set higher than a mold temperature T2 (° C.) at a side opposing to the design surface. By setting the mold temperatures as such, the surface of the molded article can be made into beautiful external appearance without sink marks or bubbles.

A temperature difference T1–T2 is preferably 5° C. or more, and more preferably 10° C. or more, and the upper limit is preferably 60° C. or less. A temperature T1 is preferably 110° C. or lower, and more preferably 95° C. or lower, and the lower limit is preferably 50° C. or higher. A temperature T2 is preferably 70° C. or lower, and more preferably 60° C. or lower, and the lower limit is preferably 30° C. or higher.

A method for adjusting a mold temperature includes, for example, a method of adjusting a mold temperature with a heater, a temperature-adjustment method with a heating medium such as temperature-controlled water or oil, circulated in a pipe embedded in the internal of a mold, and the like.

In addition, for example, after a molded article is obtained as mentioned above by referring to Japanese Patent Laid-Open No. 2007-313395, an in-mold coating method including injecting a coating agent into a space formed by the molded article and a mold from an a coating agent injection inlet separately provided in the mold, to form a coating agent layer on a surface of the molded article may be subsequently carried out as desired.

After the termination of bulk polymerization (or when in-mold coating method is carried out, after the in-mold coating method), a mold is subjected to mold opening to demold, whereby a reaction injection-molded article can be obtained.

3) Reaction Injection-Molded Article

The reaction injection-molded article of the present invention is obtained according to "the method for manufacturing a reaction injection-molded article" of the present invention, mentioned above. The reaction injection-molded article of the present invention can be manufactured efficiently on an industrial manufacturing scale by using a liquid formulation for reaction injection molding of the present invention.

The reaction injection-molded article can be directly immediately used, or a plating and/or painting may be provided in accordance with a known method as desired, in order to improve or maintain the properties of a molded article.

The reaction injection-molded article of the present invention can be suitably used in automobile applications such as bumpers and air deflectors; construction and industrial machinery applications such as wheel loaders and power shovels; recreational applications such as golf carts and arcade game machines; medical applications such as medical instruments; industrial applications such as large-scaled panels and chairs; house facility applications such as shower pans and washbowls; and the like.

EXAMPLES

The present invention will be hereinbelow described by means of Examples, without intending to limit the present invention to these Examples. Here, unless specified otherwise, "parts" and "%" are on mass basis. In addition, each of the properties was measured in accordance with the method shown hereinbelow.

(1) Gelation Time

A 50 mL container containing a stirring bar and subjected to nitrogen replacement was maintained at 30° C. To the container, 10 mL of a liquid formulation (B) at 30° C. which was previously nitrogen-replaced was injected, and the contents were stirred with a magnetic stirrer at a rotational speed of 1,000 rpm. Next, 10 mL of a liquid formulation (A) at 30° C. which was previously nitrogen-replaced was injected to the above container, and stirred for 5 seconds, to mix with the liquid formulation (B). By mixing as mentioned above, the liquid formulation (A) and the liquid formulation (B) were reacted to start the polymerization. An increase in viscosities of the liquid mixture accompanying the polymerization was measured with a B-type viscometer which was placed in the above container. The time from a point of the start of mixing of a liquid formulation (A) and a liquid formulation (B) to a point where a viscosity of a liquid mixture is shown to be 1,000 mPa·s was defined as "gelation time."

(2) Evaluation of Filling Property into Mold

A liquid formulation (A) and a liquid formulation (B) were mixed to obtain a reactive liquid mixture, and the reactive liquid mixture was injected into a plate-like mold having sizes of 297 mm×210 mm×0.1 mm, and allowed to heat-cure, and its flow length was measured. Here, heat curing was carried out by setting a mold temperature to 80° C.

(3) Flexural Strength

The flexural strength of a molded article was measured under the condition of a measurement temperature of 23° C., as prescribed in JIS K7171.

(4) Flexural Modulus

The flexural modulus of a molded article was measured under the condition of a testing speed of 2 mm/minute, as prescribed in JIS K7171.

(5) Evaluation of Residual Resin on Surface of Mold

The manufacture of a molded article was repeated 10 times, and the mold was then cooled, and the mold surfaces were observed at 10 locations of the optional areas 10 mm×10 mm by expanding 10 times with an optical microscope, and the residual resin on the mold surface was evaluated in accordance with the following evaluation criteria.

[Evaluation Criteria]
Excellent: No residual resins are found in an entire area.
Good: Residual resins are found in one or more and 2 or less areas.
Fair: Residual resins are found in 3 or more and 5 or less areas.
Poor: Residual resins are found in 6 or more areas.

Manufacturing Example 1 [Liquid Mixture 1]

Dipropylene glycol dimethyl ether (DPG) and triethylaluminum (TEAL) were mixed so as to have a molar ratio of 1:1, to prepare a liquid mixture 1.

Manufacturing Example 2 [Liquid Mixture 2]

DPG and TEAL were mixed so as to have a molar ratio of 4.5:1, to prepare a liquid mixture 2.

Manufacturing Example 3 [Liquid Mixture 3]

DPG and TEAL were mixed so as to have a molar ratio of 6:1, to prepare a liquid mixture 3.

Manufacturing Example 4 [Liquid Mixture 4]

DPG and dicyclopentadiene (DCPD) were mixed, and TEAL was added to the mixture obtained and mixed, to prepare a liquid mixture 4. Here, a molar ratio of DPG, DCPD, and TEAL was 1:5:1.

Manufacturing Example 5 [Liquid Mixture 5]

DCPD and TEAL were mixed so as to have a molar ratio of 5:1, to prepare a liquid mixture 5.

Example 1

[Liquid Formulation (A)]
The amount 4.1 parts of an ethylene-propylene copolymer [propylene units: 89%, ethylene units: 11%] was added to a mixture of norbornene-based monomers composed of 90 parts of DCPD and 10 parts of tricyclopentadiene (TCPD). Next, 0.6 parts of a liquid mixture 1 were added thereto, to give a liquid formulation (A). In the liquid formulation (A), a TEAL concentration was 22 mmol/kg, and a molar ratio of the norbornene-based monomers to TEAL (norbornene-based monomers: TEAL) was 340:1.

[Liquid Formulation (B)]
Seventeen parts of tungsten hexachloride ($WCl_6$) as a metathesis polymerization catalyst, 1 part of t-butanol, 14 parts of dodecylphenol, and 9 parts of acetyl acetone were mixed in toluene, to prepare a metathesis polymerization catalyst solution having a tungsten concentration of 11%.

Next, 4.1 parts of the above ethylene-propylene copolymer were dissolved in the mixture of the norbornene-based monomers. To this solution was further added 1.7 parts of a metathesis polymerization catalyst solution mentioned above, to give a liquid formulation (B). In the liquid formulation (B), a tungsten concentration was 7.6 mmol/kg.

The liquid formulation (A) and the liquid formulation (B) prepared above was used after storage at 50° C. for 16 hours under nitrogen atmosphere, and the gelation time was measured in accordance with the method mentioned above, to evaluate filling ability into a mold. The results are shown in Table 1.

Examples 2, 3, and 4

The same procedures as in Example 1 were carried out except that a liquid mixture 2, 3, or 4 was used in place of the liquid mixture 1, to prepare a liquid formulation (A) and a liquid formulation (B), and the gelation time was measured to evaluate filling property to a mold. The results are shown in Table 1.

Comparative Example 1

The same procedures as in Example 1 were carried out except that DPG was added to the above norbornene-based monomer and mixed, and that a liquid mixture 5 was used in place of the liquid mixture 1, to prepare a liquid formulation (A) and a liquid formulation (B), and the gelation time was measured to evaluate filling property to a mold. Here, in the liquid formulation (A), a molar ratio of DPG to TEAL was 1:1. The results are shown in Table 1.

TABLE 1

| | Molar Ratio of Liquid Mixture | TEAL Content in Liquid Formulation (A) (mmol/kg) | Gelation Time (second) | Flow Length (mm) |
|---|---|---|---|---|
| Ex. 1 | DPG:TEAL 1:1 | 22 | 4 | 297 |
| Ex. 2 | DPG:TEAL 4.5:1 | 22 | 10 | 297 |
| Ex. 3 | DPG:TEAL 6:1 | 22 | 16 | 297 |
| Ex. 4 | DPG:DCPD:TEAL 1:5:1 | 22 | 4 | 297 |
| Comp. Ex. 1 | DCPD:TEAL 5:1 | 22*[1)] | 0.2 | 21 |

*[1)]DPG was added to the liquid formulation (A) so that a molar ratio would be TEAL:DPG = 1:1.

In Examples and Comparative Examples, in order to evaluate storage stability, liquid formulations (A) and (B) were stored at 50° C. for 16 hours under nitrogen atmosphere, and the changes during storage were accelerated and used (acceleration test).

It can be seen from Table 1 that in Examples 1 to 4 where a liquid formulation (A) prepared by mixing norbornene-based monomers (mixture of DCPD and TCPD) and an activator (TEAL) in the presence of an ether compound (DPG) is used, the gelation time of a reactive liquid mixture obtained by mixing liquid formulations (A) and (B) is 4 seconds or more, and the liquid mixture is filled in an entire mold (297 mm), so that all could obtain molded articles which do not have any problems in quality of shapes.

On the other hand, in a case of Comparative Example 1 where a liquid formulation (A) prepared by previously mixing only two components, i.e. a part of norbornene-based monomers (DCPD) and an activator (TEAL) in the absence of an ether compound (DPG) is used, it can be seen that since the gelation time of the reactive liquid mixture obtained would be very short (shorter than 2 seconds), the flow length would be shortened with the very short gelation time, so that the filling ability is markedly worsened, whereby a molded article having a desired quality in shape could not be obtained.

It can be seen from the comparisons of Examples 1 to 3 that the gelation time is lengthened if the amount of the ether compound (DPG) used is increased.

It can be seen from the comparisons of Examples 1 and 4 that the changes in the gelation time could not be observed even when a norbornene-based monomer (DCPD) is contained in a liquid mixture prepared by mixing the components in the presence of an ether compound (DPG).

Examples 5 to 8, and Comparative 2

A mold for reaction injection molding made of two aluminum plates capable of forming a cavity of length 245 mm×width 210 mm× thickness 3 mm in an internal thereof was furnished, and one of the molds was heated with a heater to 90° C. to adjust a temperature difference between a core mold and a cavity mold to 40° C. Here, this mold for reaction injection molding has a structure of having an injection pore for a liquid formulation for reaction injection molding on one side of the aluminum plates.

A liquid formulation (A) and a liquid formulation (B) obtained in each of Examples 1 to 4 and Comparative Example 1 (all after storing at 50° C. for 16 hours under nitrogen atmosphere) were each heated to 30° C., and the liquid formulations were injected to a mold for reaction injection molding from an injection pore, while mixing the contents in a proportion of a mixing ratio of 1:1 (mass ratio) with a static mixer. Bulk polymerization was carried out in the mold for 120 seconds, and the mold was subjected to mold opening to demold, thereby giving each of molded articles made of a polymerization-cured norbornene-based resin. In each Examples and Comparative Examples, the manufacture of molded articles was carried out 10 times. All the norbornene-based resins obtained had a specific gravity of 1.04, and a glass transition temperature (Tg) measured according to the DSC method of 145° C.

Next, the measurements for flexural strength and flexural modulus were carried out for any five of ten molded articles obtained in each of Examples 5 to 8 and Comparative Example 2, and a mean thereof was obtained as flexural strength and flexural modulus of the molded articles obtained in Examples 5 to 8 and Comparative Example 2. In addition, the residual resin on the surface of the mold used was evaluated in accordance with the above method. The results are shown in Table 2.

TABLE 2

| | Ex. 5 | Ex. 6 | Ex. 7 | Ex. 8 | Comp. Ex. 2 |
|---|---|---|---|---|---|
| Liquid Formulation (A) | Liquid Formulation of Ex. 1 | Liquid Formulation of Ex. 2 | Liquid Formulation of Ex. 3 | Liquid Formulation of Ex. 4 | Liquid Formulation of Comp. Ex. 1 |
| Flexural Strength (MPa) | 74 | 76 | 75 | 74 | 61 |

TABLE 2-continued

| | Ex. 5 | Ex. 6 | Ex. 7 | Ex. 8 | Comp. Ex. 2 |
|---|---|---|---|---|---|
| Flexural Modulus (GPa) | 1.8 | 1.8 | 1.8 | 1.8 | 1.6 |
| Evaluation of Residual Resin on Surface of Mold | Good | Excellent | Good | Good | Fair |

It can be seen from Table 2 that in Example 5 to 8, the molded articles having excellent flexural strength and flexural modulus, and excellent demoldability were obtained.

On the other hand, it can be seen in Comparative Example 2 that a mixing failure of the reactive liquid mixture is caused due to a very short gelation time (shorter than 2 seconds), and the metathesis polymerization catalyst is not sufficiently activated, so that the polymerization activity is assumed to be lowered, whereby physical properties of the molded articles such as flexural strength, flexural modulus, and the evaluation of residual resin on surface of the mold are markedly lowered.

It can be seen that among Examples 5 to 8 a molded article of Example 6 in which a liquid formulation (A) prepared by mixing an ether compound (DPG) and an activator (TEAL) in a molar ratio of 4.5:1 is used is preferred.

INDUSTRIAL APPLICABILITY

The liquid formulation for reaction injection molding of the present invention can be suitably used in the field of manufacture of reaction injection-molded articles. Further, the reaction injection-molded article of the present invention has excellent mechanical properties and finishing of surface of the manufactured articles, so that the reaction injection-molded article can be suitably used in applications of automobile parts, parts of housing facilities, and the like.

What is claimed is:

1. A method for manufacturing a liquid formulation for reaction injection molding for polymerizing a norbornene-based monomer in the presence of a metathesis polymerization catalyst comprising tungsten as a center metal, the liquid formulation comprising a norbornene-based monomer, provided that in case where the norbornene-based monomer includes exo-dicyclopentadiene, a content of exo-dicyclopentadiene is from 0 to 2% by mass of the norbornene-based monomer, an activator of the catalyst, and an ether compound wherein the ether compound is dipropyleneglycol dimethyl ether, the method comprising the step of mixing a liquid mixture comprising the ether compound and the activator of the catalyst with the norbornene-based monomer,
wherein the norbornene-based monomer is selected from the group consisting essentially of norbornene, norbornenes having an alkyl group, norbornenes having an alkenyl group, norbornenes having an aromatic ring, norbornenes having a polar group including an oxygen atom, dicyclopentadiene, methyldicyclopentadiene, tricyclo[5.2.1.0$^{2,6}$]deca-8-ene, tetracyclo[9.2.1.0$^{2,10}$.0$^{3,8}$] tetradeca-3,5,7,12-tetraene, tetracyclo[10.2.1.0$^{2,11}$.0$^{4,9}$] pentadeca-4,6,8,13-tetraene, tricyclopentadiene, tetracyclododecene, tetracyclododecenes having an aromatic ring, tetracyclododecenes having a substituent including an oxygen atom, tetracyclododecenes having a substituent including a halogen atom, tetracyclododecenes having a substituent including a silicon atom, hexacycloheptadecene, hexacycloheptadecenes having an alkyl group, hexacycloheptadecenes having a double bond outside the ring, hexacycloheptadecenes having an aromatic ring, hexacycloheptadecenes having a substituent including an oxygen atom, hexacycloheptadecenes having a substituent including a halogen atom, and hexacycloheptadecenes having a substituent including a silicon atom.

2. The method according to claim 1, wherein the blending proportion of the ether compound to the activator (ether compound/activator) is in a molar ratio of from 0.1/1 to 30/1.

3. The method according to claim 1, wherein a gelation time upon mixing with the metathesis polymerization catalyst including tungsten as a center metal is 2 seconds or longer.

4. A method for manufacturing a reaction injection-molded article, comprising the step of subjecting a reactive liquid mixture obtained by mixing a liquid formulation for reaction injection molding produced by the method of claim 1, with a metathesis polymerization catalyst comprising tungsten as a center metal to bulk polymerization in a mold, thereby carrying out reaction injection molding.

5. The method for manufacturing a reaction injection-molded article according to claim 4, wherein the reactive liquid mixture is prepared by mixing a liquid formulation for reaction injection molding with a liquid formulation comprising the norbornene-based monomer and the metathesis polymerization catalyst comprising tungsten as a center metal.

* * * * *